United States Patent
Sasaki

(10) Patent No.: US 9,431,920 B2
(45) Date of Patent: Aug. 30, 2016

(54) NON-ISOLATED DC/DC CONVERTER WITH 2 INDUCTORS AND ZERO VOLTAGE SWITCHING

(71) Applicant: SHARP KABUSHIKI KAISHA, Osaka-shi, Osaka (JP)

(72) Inventor: Masato Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 110 days.

(21) Appl. No.: 14/396,136

(22) PCT Filed: Apr. 30, 2013

(86) PCT No.: PCT/JP2013/062519
§ 371 (c)(1),
(2) Date: Oct. 22, 2014

(87) PCT Pub. No.: WO2013/190914
PCT Pub. Date: Dec. 27, 2013

(65) Prior Publication Data
US 2015/0381072 A1 Dec. 31, 2015

(30) Foreign Application Priority Data

Jun. 19, 2012 (JP) ................................ 2012-137723

(51) Int. Cl.
*H02M 3/158* (2006.01)
*H02M 7/217* (2006.01)
*H02M 1/34* (2007.01)

(52) U.S. Cl.
CPC ............. *H02M 7/217* (2013.01); *H02M 3/158* (2013.01); *H02M 2001/342* (2013.01)

(58) Field of Classification Search
CPC ...................................................... H02M 3/158
See application file for complete search history.

(56) References Cited

U.S. PATENT DOCUMENTS

| 5,736,842 A | 4/1998 | Jovanovic | |
| 6,166,500 A * | 12/2000 | Makaran | H02M 1/34 318/400.22 |
| 2004/0227496 A1 | 11/2004 | Hosotani et al. | |
| 2005/0226012 A1 | 10/2005 | Jovanovic et al. | |
| 2007/0120541 A1* | 5/2007 | Wang | H02M 7/48 323/225 |
| 2013/0119966 A1* | 5/2013 | Touzani | B60L 11/005 323/312 |

FOREIGN PATENT DOCUMENTS

| CN | 1551470 A | 12/2004 |
| CN | 1574582 A | 2/2005 |
| JP | 5-64448 A | 3/1993 |
| JP | 2004-343923 A | 12/2004 |

* cited by examiner

*Primary Examiner* — Harry Behm
*Assistant Examiner* — Peter Novak
(74) *Attorney, Agent, or Firm* — Birch, Stewart, Kolasch & Birch, LLP

(57) ABSTRACT

Zero-voltage switching of a switching element (Q2) is achieved by turning off a switching element (Q1) and then turning on switching element (Q2) while the parasitic diode ($D_{Q2}$) of switching element (Q2) is turned on. Subsequently, switching element (Q2) is turned off when the current flowing through switching element (Q2) changes from negative to positive (in a direction from the drain towards the source) and the current reaches a prescribed threshold value. Then, zero-voltage switching of switching element (Q1) is achieved by turning on switching element (Q1) while the parasitic diode ($D_{Q1}$) of switching element (Q1) is turned on.

6 Claims, 11 Drawing Sheets

NON-ISOLATED DC/DC CONVERTER WITH 2 INDUCTORS AND ZERO VOLTAGE SWITCHING

TECHNICAL FIELD

The present invention relates to switching power supply circuits.

BACKGROUND ART

A method of switching a switching element when the input voltage thereof is substantially zero so as to lower the loss of a switching power supply circuit is disclosed in patent document 1. FIG. 10 is a circuit diagram of a switching power supply circuit 901 corresponding to the circuit disclosed in patent document 1. The power supply circuit 901 converts a direct-current voltage Vin from a power input portion 902 into another direct-current voltage Vo and outputs it (Vin<Vo).

In the power supply circuit 901 of FIG. 10, during the period in which a switching element Q1 is on, energy is stored in an inductor L2, and during the period in which the switching element Q1 is off, a capacitor C1 is charged and is thereafter changed into a discharged state. During this discharge period, a switching element Q2 is turned off to discharge charge stored in the parasitic capacitance of the switching element Q1, and with a voltage across both ends of the switching element being substantially zero, the switching element is turned on (this is referred to as zero voltage switching). It is assumed that in the power supply circuit 901, the charging voltage of the capacitor C1 is maintained at a constant value Vc. The side of the switching element Q1 is the positive terminal of the capacitor C1.

FIG. 11 is an operation timing chart of the power supply circuit 901 in FIG. 10. In FIG. 11, the vertical axis corresponds to a voltage or a current, and the horizontal axis corresponds to time. In FIG. 11, waveforms 911 to 919 are respectively the voltage waveform of a gate signal Q1g of the switching element Q1, the voltage waveform of a gate signal Q2g of the switching element Q2, the waveform of a current L1i flowing through an inductor L1, the waveform of a current L2i flowing through the inductor L2, the waveform of a current Q1i flowing through the switching element Q1, the waveform of a current Q2i flowing through the switching element Q2, the waveform of a current D1i flowing through a diode D1, the waveform of a drain-source voltage Q1v of the switching element Q1 and the waveform of a drain-source voltage Q2v of the switching element Q2. In the currents Q1i and Q2i, the polarity of the current flowing from the drain to the source is assumed to be positive.

First, during the period (period before a time T0 in FIG. 11) in which the gate signal Q1g is turned high, and the switching element Q1 is on, in a path passing through the positive terminal of the power input portion 902, the inductor L1, the inductor L2, the switching element Q1 and the negative terminal of the power input portion 902, the current Q1i of the switching element Q1, the current L1i of the inductor L1 and the current L2i of the inductor L2 flow, with the result that the currents Q1i, L1i and L2i are linearly increased (at a gradient of Vin/(L1+L2)). During the period in which the switching element Q1 is on, the switching element Q2 is off, and consequently, the current Q2i is zero. The values of the currents L1i, L2i and Q1i at the time T0 are represented by Ip (Ip>0).

When at the time T0, the switching element Q1 is turned off, the current Q1i of the switching element Q1 is decreased from Ip to zero, and the drain-source voltage Q1v of the switching element Q1 is increased, with the result that the current Q2i starts to flow from the source to the drain of the switching element Q2 and thus the drain-source voltage Q2v of the switching element Q2 is decreased. The initial value of the current Q2i that starts to flow when at the time T0, the switching element Q1 is turned off is (−Ip).

When at a time T1, the voltage Q1v reaches a voltage "Vo+Vc", a current flows both through a path passing through the positive terminal of the power input portion 902, the inductor L1, the diode D1, a capacitor Co and the negative terminal of the power input portion 902 and through a path passing through the inductor L1, the inductor L2, the parasitic diode of the switching element Q2, the capacitor C1 and the capacitor Co, with the result that the current L1i is linearly decreased (at a gradient of (Vo−Vin)/L1), the current L2i is linearly decreased (at a gradient of −Vc/L2), the current Q2i is linearly increased (at a gradient of Vc/L2), the current D1i (=L1i−L2i) is linearly increased and the current Q2i becomes zero at a time T2. A control circuit 910 turns on the switching element Q2 during the period between the time T1 and the time T2, that is, during the period in which the negative current Q2i flows through the switching element Q2, and thereby realizes the zero voltage switching of the switching element Q2.

At and after the time T0, the current Q2i that has been increased from (−Ip) at the gradient of "Vc/L2" continues to be increased at the same gradient of "Vc/L2" even after the current Q2i becomes zero at the time T2. At a time T3, the gate signal Q2g is turned low, and thus a resonant operation is started between the inductor L2, the output capacitance of the switching element Q1 and the output capacitance of the switching element Q2, the voltage Q2v is increased while the voltage Q1v is decreased and the voltage Q1v becomes zero at a time T4. This resonant operation causes the parasitic diode of the switching element Q1 to become conductive and the negative current Q1i flows at and after the time T3 until a time T5, which will be described later. Since when the charging voltage Vc of the capacitor C1 is constant, "(charging current of the capacitor C1)=(discharge current of the capacitor C1)" holds true, at the time t3, L2i=−Ip and Q2i=Ip.

During the period (that is, during the period between the time T4 and the time T5) in which the negative current Q1i flows through the switching element Q1 after the voltage Q1v becomes zero at the time T4, the control circuit 910 turns the gate signal Q1g high, and thereby realizes the zero voltage switching of the switching element Q1. At and after the time T3, the currents Q1i and L2i are linearly increased (at the gradient of Vo/L2), the current D1i is linearly decreased and at a time T6, D1i=0 and L1i=L2i=Q1i.

Patent document 2 discloses a configuration that is designed for improving the circuit configuration in patent document 1.

RELATED ART DOCUMENT

Patent Document

Patent document 1: Specification of U.S. Pat. No. 5,736,842

Patent document 2: Japanese Patent No. 4114537

DISCLOSURE OF THE INVENTION

Problems to be Solved by the Invention

In the power supply circuit 901 of FIG. 10, the energy utilized for the zero voltage switching is "L2×Ip²/2". Hence, when the input voltage (Vin) or the output current of the power supply circuit 901 is significantly changed, and thus the value of Ip is significantly changed, the energy stored in the inductor L2 is significantly changed, and thus the prerequisite that the charging voltage of the capacitor C1 is constant does not hold true, with the result that it is difficult to realize the zero voltage switching (the details of which will also be described later). In other words, the power supply circuit 901 has difficulty in realizing the zero voltage switching in a wide range of the input voltage and the output current. In particular, in a switching power supply circuit having a harmonic current regulation function, since after an alternating-current voltage is rectified, switching is performed without smoothing, an input voltage is significantly changed. Hence, the loss caused by preventing the zero voltage switching from being reliably performed is remarkably increased. Probably, there is a room for improvement on the method disclosed in patent document 2.

Hence, the present invention has an object to provide a switching power supply circuit that facilitates the lowering of loss.

Means for Solving the Problem

According to the present invention, there is provided a switching power supply circuit that includes: a first switching element which turns on and off passage of a current supplied from a power input portion; a first inductor which stores a power input through the first switching element and which discharges the power to a power output portion; a rectifying diode which rectifies a current toward the power output portion; and a smoothing capacitor which smoothes a voltage in the power output portion, the switching power supply circuit including: a second inductor that is inserted into a path of a current which flows from the power input portion to the first switching element and the first inductor during a period in which the first switching element is on; a series circuit that is formed by connecting a second switching element and a voltage source in series; and a control circuit that controls turning on of the first switching element and turning on of and turning off of the second switching element such that a voltage applied to both ends of the first switching element when the first switching element is turned on and a voltage applied to both ends of the second switching element when the second switching element is turned on are equal to or less than a predetermined value, where the series circuit is connected between a connection point between the second inductor and the first switching element and the power output portion, is connected between the connection point and a reference potential point having a negative terminal potential of the power input portion, is connected between the connection point and the power input portion or is connected between the connection point and a terminal of the rectifying diode.

In this way, it is possible to reduce the switching loss of each switching element while coping with changes over a wide range in the input voltage and the output current of the switching power supply circuit.

Specifically, for example, preferably, the control circuit controls the turning off of the second switching element according to at least one of a current flowing through the second switching element and a current flowing through the second inductor.

For example, the voltage source may output a direct-current voltage obtained by rectifying and smoothing an alternating-current voltage from a second voltage source.

In this case, for example, the second voltage source may be formed with a third inductor, and the alternating-current voltage may be formed by a voltage induced by the third inductor.

The voltage source is formed by utilization of the voltage induced by the third inductor, and thus it is possible to form the voltage source with a small number of components.

For example, the third inductor may be magnetically coupled with the first inductor.

In this way, the originally necessary first inductor is utilized, and thus it is possible to obtain the voltage induced by the third inductor, with the result that it is possible to reduce the increase in the number of components.

Specifically, for example, the control circuit may turn on the second switching element after a predetermined time has elapsed since turning off of the first switching element, thereafter turn off the second switching element according to at least one of a current flowing through the second switching element and a current flowing through the second inductor, turn on the first switching element after a predetermined time has elapsed since the turning off of the second switching element and determine timing at which the first switching element is turned on again according to a voltage of the power output portion.

For example, the power input portion may be formed with an alternating-current power supply, a rectifying circuit that rectifies an alternating-current power from the alternating-current power supply and a capacitor that stores a power of a pulsating voltage obtained by the rectification, and may input the pulsating voltage to the switching power supply circuit, and a control portion including the control circuit may control a power factor of a circuit including the switching power supply circuit for the alternating-current power supply based on the pulsating voltage, a voltage of the power output portion and a current flowing through the first switching element or the first inductor.

In this way, it is possible to realize the reduction in the switching loss and the improvement of the power factor.

Advantages of the Invention

According to the present invention, it is possible to provide a switching power supply circuit that facilitates the lowering of loss.

DESCRIPTION OF EMBODIMENTS

Examples of the embodiment of the present invention will be specifically described below with reference to accompanying drawings. In the referenced drawings, the same parts are identified with the same symbols, and the description of the same parts will not be repeated in principle. In the present specification, for simplification of description, by providing a sign or a symbol for information, a signal, a physical amount, a state amount, a member or the like, the name of the information, the signal, the physical amount, the state amount, the member or the like corresponding to the sign or the symbol may be omitted or described in short. Although in order for the conventional circuit of FIG. 10 to be easily compared with the circuit of the present embodiment, the same symbols as used in the description of the conventional circuit are used in the description of the present embodiment, when the description of the present embodiment is interpreted, the description of the conventional circuit is ignored, and the description of the present embodiment is prioritized.

Figure 1:
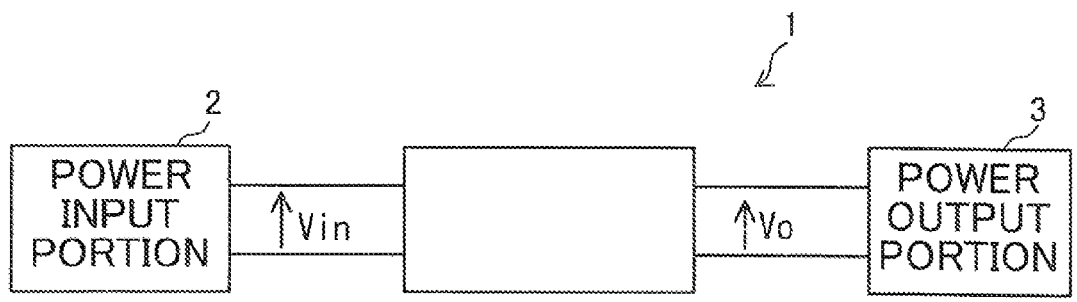
FIG. 1 A schematic overall configuration diagram of a switching power supply circuit according to an embodiment of the present invention.

FIG. 1 is a schematic overall configuration diagram of a switching power supply circuit 1 according to the embodiment of the present invention. The power supply circuit 1 converts, by switching, an input power having a voltage Vin supplied from a power input portion 2 into an output power having a voltage Vo, and outputs the output power to a power output portion 3. It may be assumed that at least either of the power input portion 2 and the power output portion 3 is included in the constituent elements of the power supply circuit 1. The power input portion 2 has a positive terminal and a negative terminal, and the negative terminal of the power input portion 2 is connected to ground. The ground is a reference potential point that has a reference potential equal to the negative terminal potential of the power input portion 2. Although the voltages Vin and Vo may be negative, in the following description, it is assumed that the voltages Vin and Vo are positive.

First Embodiment

Figure 2:
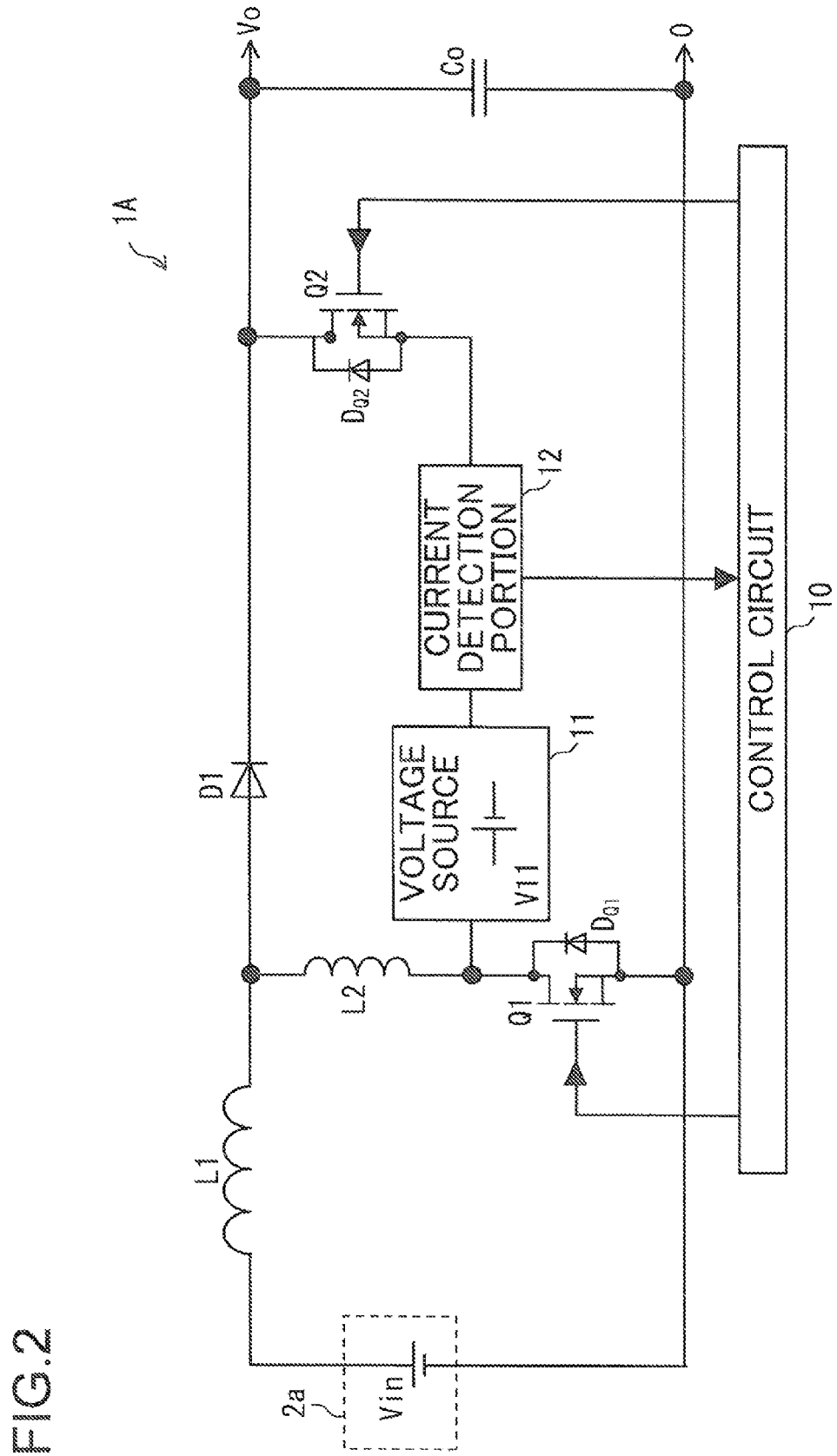
FIG. 2 A configuration diagram of a switching power supply circuit according to a first embodiment of the present invention.

A first embodiment of the present invention will be described. FIG. 2 is a configuration diagram of a switching power supply circuit 1A as the power supply circuit 1 according to the first embodiment. In the first embodiment, a power input portion 2a is an example of the power input portion 2, and outputs a direct-current voltage Vin (the same is true for second to fifth embodiments, which will be described later). The power supply circuit 1A includes a control circuit 10, a voltage source 11, a current detection portion 12, a diode (rectifying diode) D1, a capacitor (smoothing capacitor) Co, a first inductor L1, a second inductor L2, a first switching element Q1 and a second switching element Q2. Since in the power supply circuit 1A, a step-up converter system is adopted, Vin<Vo (the same is true for power supply circuits 1B, 1C, 1D and 1F in FIGS. 5, 6, 7 and 9).

In the first embodiment, the power input portion 2a outputs, from its positive terminal, the direct-current voltage Vin with reference to the ground (the same is true for the second to fifth embodiments, which will be described later). The positive terminal of the power input portion 2a is connected through the inductor L1 to one end of the inductor L2, and the other end of the inductor L2 is connected through the switching element Q1 to the ground. A connection point between the inductors L1 and L2 is connected the anode of the diode D1, and the cathode of the diode D1 is connected to the positive terminal of the capacitor Co. The negative terminal of the capacitor Co is connected to the ground. The positive terminal of the capacitor Co corresponds to the power output portion 3 (see FIG. 1), and the voltage of the positive terminal of the capacitor Co corresponds to the voltage Vo of the power output portion 3 (see FIG. 1). Between the connection point between the inductor L2 and the switching element Q1 and the connection point (that is, the cathode of the diode D1) between the diode D1 and the capacitor Co, a series circuit of the voltage source 11, the current detection portion 12 and the switching element Q2 is connected.

The switching elements Q1 and Q2 are N-channel type MOSFETs (metal-oxide-semiconductor field-effect transistor). In the switching element Q1, the drain is connected to the inductor L2, and the source is connected to the ground. In the switching element Q2, the drain is connected to the cathode of the diode D1, and the source is connected through the current detection portion 12 to the negative terminal of the voltage source 11. The positive terminal of the voltage source 11 is connected to the connection point (hence, the drain of the switching element Q1) between the inductor L2 and the switching element Q1. Diodes $D_{Q1}$ and $D_{Q2}$ are respectively the parasitic diodes (body diodes) of the switching elements Q1 and Q2. Hence, the diode $D_{Q1}$ is connected in parallel to the source and the drain of the switching element Q1 with assumption that the direction facing, from the source, the drain of the switching element Q1 is a forward direction, and the diode $D_{Q2}$ is connected in parallel to the source and the drain of the switching element Q2 with assumption that the direction facing, from the source, the drain of the switching element Q2 is a forward direction.

The voltage source 11 is a constant voltage source that outputs a constant direct-current voltage V11 from its positive terminal with reference to its negative terminal. The current detection portion 12 is a current sensor that detects the current Q2i flowing between the drain and the source of the switching element Q2. However, the current detection portion 12 may be a current sensor that detects the current L2i flowing through the inductor L2. In this case, for example, the current detection portion 12 may be inserted between the connection point between the inductor L1 and the diode D1 and the inductor L2 or may be inserted between the connection point between the switching element Q1 and the voltage source 11 and the inductor L2. The current detection portion 12 may also detect both the currents Q2i and L2i.

The control circuit 10 controls the turning on and off of the switching elements Q1 and Q2 based on the detection current information (that is, the detection values of the current Q2i or the current L2i) of the current detection portion 12 and output voltage information. In the switching power supply circuit 1A, a voltage detection portion (not shown) for detecting the output voltage Vo is provided, and the output voltage information is information indicting the detection value of the output voltage Vo (the same is true for the switching power supply circuits in the other embodiments, which will be described later). In FIG. 2, how the output voltage information is fed to the control circuit 10 is not shown (the same is true for FIGS. 4 to 8, which will be described later). The control circuit 10 may control, by further using information on the current flowing through the inductor L1 or the switching element Q1, the turning on and off of the switching elements Q1 and Q2 (an example of the method of utilizing such information will be described later in the sixth embodiment).

Figure 3:
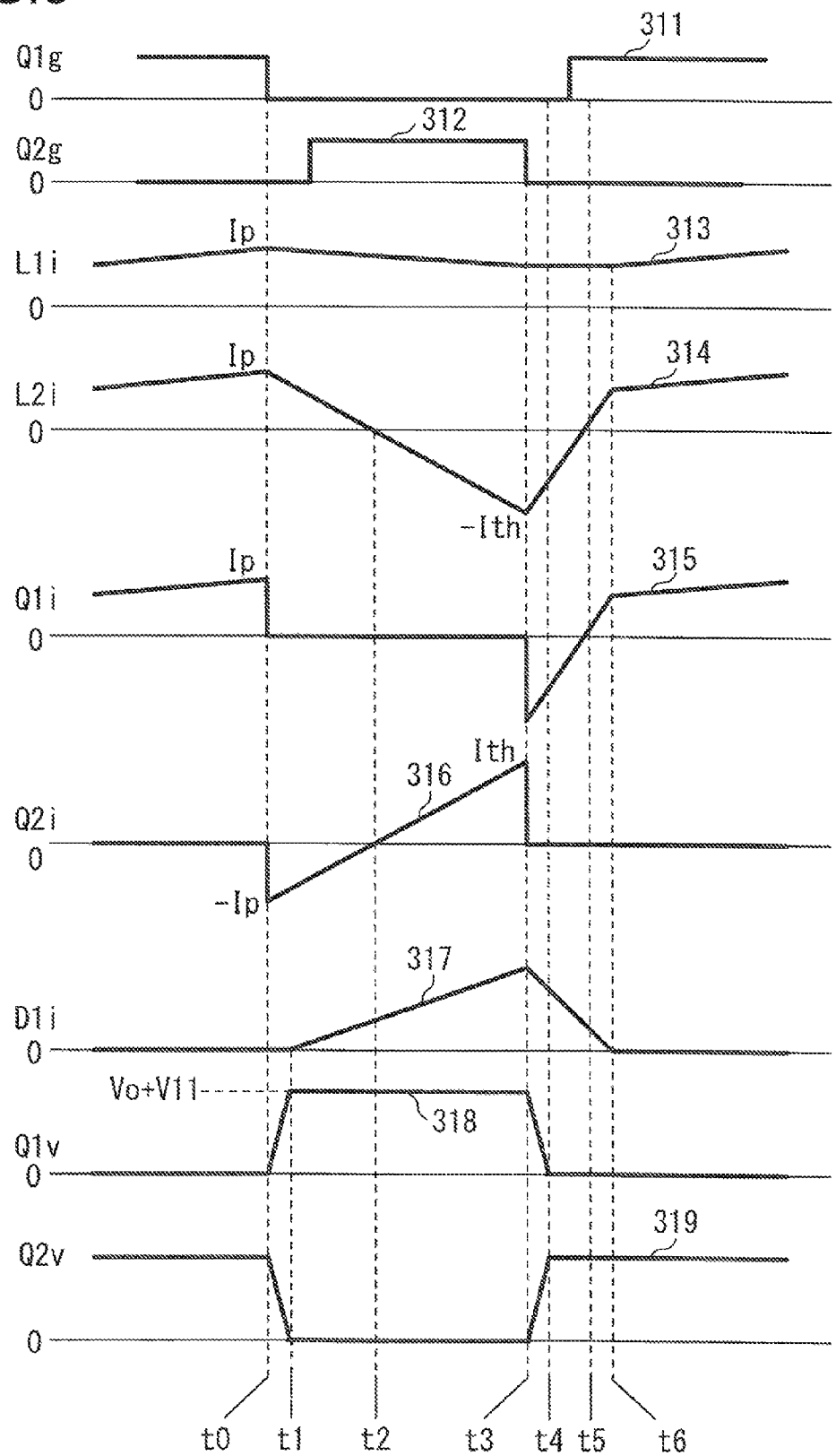
FIG. 3 An operation timing chart of the switching power supply circuit according to the first embodiment of the present invention.

FIG. 3 is an operation timing chart of the power supply circuit 1A. In FIG. 3, the vertical axis corresponds to a voltage or a current, and the horizontal axis corresponds to time. In FIG. 3, waveforms 311 to 319 are respectively the voltage waveform of a gate signal Q1g of the switching element Q1, the voltage waveform of a gate signal Q2g of the switching element Q2, the waveform of a current L1i flowing through the inductor L1, the waveform of a current L2i flowing through the inductor L2, the waveform of a current (drain current) Q1i flowing through the switching element Q1, the waveform of a current (drain current) Q2i flowing through the switching element Q2, the waveform of a current D1i flowing through a diode D1, the waveform of a drain-source voltage (that is, drain potential with reference to a source potential) Q1v of the switching element Q1 and the waveform of a drain-source voltage (that is, drain potential with reference to a source potential) Q2v of the switching element Q2.

The gate signal Q1g of the switching element Q1 indicates the gate potential of the switching element Q1 with reference to the source potential of the switching element Q1 (the same is true for the gate signal Q2g). The control circuit 10 supplies a high-level voltage signal or a low-level voltage signal lower than the high-level voltage signal to the gates of the switching elements Q1 and Q2. When the high-level voltage signal is supplied to the gate of the switching element Q1, the switching element Q1 is turned on (the switching element Q1 becomes conductive between the drain and the source) whereas when the low-level voltage signal is supplied to the gate of the switching element Q1, the switching element Q1 is turned off (the switching element Q1 is interrupted between the drain and the source). The same is true for the switching element Q2. In the current L1i, the polarity of the current flowing from the power input portion 2a to the connection point between the inductors L1 and L2 is assumed to be positive. In the current L2i, the polarity of the current flowing from the connection point between the inductors L1 and L2 to the connection point between the inductor L2 and the switching element Q1 is assumed to be positive. In the switching element Q1, the current Q1i is a current flowing between the drain and the source of the switching element Q1, and includes a current component flowing through the parasitic diode $D_{Q1}$ (the same is true for the switching element Q2). In the currents Q1i and Q2i, the polarity of the current flowing from the drain to the source is assumed to be positive.

An operation of the power supply circuit 1A will be described with reference to FIG. 3. It is assumed that time passes from a time t0 to a time t6. In the following formulas, L1 and L2 represent the inductance values of the inductors L1 and L2, respectively. The period during which the switching element Q1 is on and the period during which the switching element Q1 is off are also referred to as an on-period and an off-period of the switching element Q1, respectively (the same is true for the switching element Q2).

First, during the period (period before the time t0 in FIG. 3) in which the gate signal Q1g is turned high, and the switching element Q1 is on, in a path passing through the positive terminal of the power input portion 2a, the inductor L1, the inductor L2, the switching element Q1 and the negative terminal of the power input portion 2a, the current Q1i of the switching element Q1, the current L1i of the inductor L1 and the current L2i of the inductor L2 flow, with the result that the currents Q1i, L1i and L2i are linearly increased (at a gradient of Vin/(L1+L2)). During the period in which the switching element Q1 is on, the switching element Q2 is off, and consequently, the current Q2i is zero.

At the time t0, the control circuit 10 switches the gate signal Q1g from high to low, and thereby turns off the switching element Q1. The values of the currents L1i, L2i and Q1i at the time t0 are represented by Ip (Ip>0). When at the time t0, the switching element Q1 is turned off, the current Q1i of the switching element Q1 is decreased from Ip to zero, and the drain-source voltage Q1v of the switching element Q1 is increased, with the result that the current Q2i starts to flow from the source to the drain of the switching element Q2 and thus the drain-source voltage Q2v of the switching element Q2 is decreased. The initial value of the current Q2i that starts to flow when at the time t0, the switching element Q1 is turned off is (−Ip).

When at the time t1, the voltage Q1v that has been increased since the time t0 reaches a voltage "Vo+V11", a current flows both through a path passing through the positive terminal of the power input portion 2a, the inductor L1, the diode D1, the capacitor Co and the negative terminal of the power input portion 2a and through a path passing through the inductor L1, the inductor L2, the voltage source 11, the current detection portion 12, the parasitic diode $D_{Q2}$ of the switching element Q2 and the capacitor Co, with the result that the current L1i is linearly decreased (at a gradient of (Vo−Vin)/L1), the current L2i is linearly decreased (at a gradient of −V11/L2), the current Q2i is linearly increased (at a gradient of V11/L2), the current D1i (=L1i−L2i) is linearly increased and the current Q2i becomes zero at the time t2. The control circuit 10 switches the gate signal Q2g from low to high (turns on the switching element Q2) during the period between the time t1 and the time t2, that is, during the period in which the negative current Q2i flows through the switching element Q2, and thereby realizes the zero voltage switching of the switching element Q2.

In the switching element Q2, although strictly speaking, during the period in which the parasitic diode $D_{Q2}$ is conductive, the value of the source-drain voltage Q2v is negative by a voltage corresponding to a voltage drop of the parasitic diode $D_{Q2}$, in general, the turning on in a state where the source side has a higher potential than the drain does not cause a switching loss. Hence, the source-drain voltage Q2v during the period in which the parasitic diode $D_{Q2}$ is conductive is assumed to be zero, and the turning on of the switching element Q2 during such a period is referred to as the zero voltage switching of the switching element Q2. The same is true for the switching element Q1.

At and after the time t0, the current Q2i that has been increased from (−Ip) at the gradient of "V11/L2" continues to be increased at the same gradient of "V11/L2" even after the current Q2i becomes zero at the time t2, and reaches a predetermined threshold value Ith at the time t3 (Ith>0). Accordingly, at and after the time t0, the current L2i that has been decreased from Ip at the gradient of "−V11/L2" continues to be decreased at the same gradient of "−V11/L2"

even after the current L2$i$ becomes zero at the time t2, and reaches (−Ith) at the time t3. As described above, the current detection portion 12 transmits the detection value of the current Q2$i$ or L2$i$ (the detection value of the current Q2$i$ in the circuit example of FIG. 2) to the control circuit 10. When the control circuit 10 determines that the current Q2$i$ is increased to the predetermined value Ith (or when the control circuit 10 determines that the current L2$i$ is decreased to the predetermined value (−Ith)), based on the detection value of the current detection portion 12, the control circuit 10 turns the gate signal Q2$g$ low to turn off the switching element Q2.

The switching element Q2 is turned off, and thus a resonant operation is started between the inductor L2, the output capacitance of the switching element Q1 and the output capacitance of the switching element Q2, the voltage Q2$v$ is increased while the voltage Q1$v$ is decreased and the voltage Q1$v$ becomes zero at the time t4. This resonant operation causes the parasitic diode $D_{Q1}$ of the switching element Q1 to become conductive and the negative current Q1$i$ flows at and after the time t3 until the time t5, which will be described later. The output capacitance of the switching element Q1 indicates the capacitance between the source and the drain (parasitic capacitance) of the switching element Q1 (the same is true for the switching element Q2).

After the voltage Q1$v$ becomes zero at the time t4, during the period in which the negative current Q1$i$ flows through the switching element Q1 (that is, during the period between the time t4 and the time t5), the control circuit 10 switches the gate signal Q1$g$ from low to high (turns on the switching element Q1), and thereby realizes the zero voltage switching of the switching element Q1. At and after the time t3, the currents Q1$i$ and L2$i$ are linearly increased (at the gradient of Vo/L2), the current D1$i$ is linearly decreased and at the time t6, D1$i$=0 and L1$i$=L2$i$=Q1$i$. After the time t6, the control circuit 10 determines, based on the output voltage information (the detection value of the output voltage Vo), timing for the subsequent turning off of the switching element Q1.

As in the waveform 316 of the current Q2$i$ in FIG. 3, the input current of the voltage source 11, often, is not equal to the output current of the voltage source 11. The input current of the voltage source 11 indicates a current that flows from the connection point between the switching element Q1 and the inductor L2 into the voltage source 11; the output current of the voltage source 11 indicates a current that flows, from the voltage source 11, out to the connection point between the switching element Q1 and the inductor L2. Since the current Q2$i$ flowing through the switching element Q2 passes through the voltage source 11, that the input current is not equal to the output current in the voltage source 11 means that the negative maximum value (−Ip) and the positive maximum value (Ith) in the current Q2$i$ are not equal to each other. In the example of FIG. 3, "the input current of the voltage source 11"<"the output current of the voltage source 11", that is, |Ip|<|Ith|.

Figure 10:
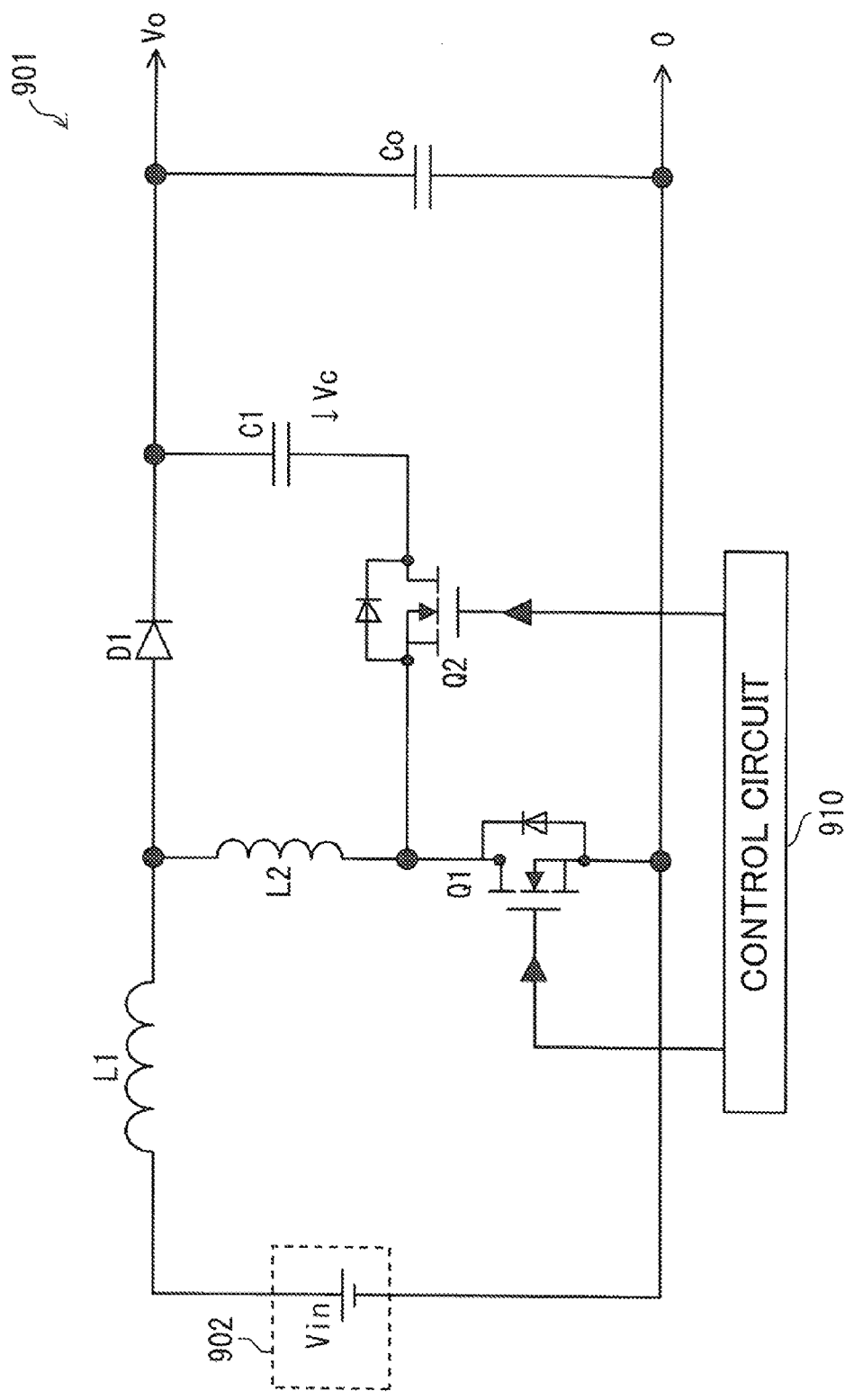
FIG. 10 A circuit diagram of a conventional switching power supply circuit.
Figure 11:
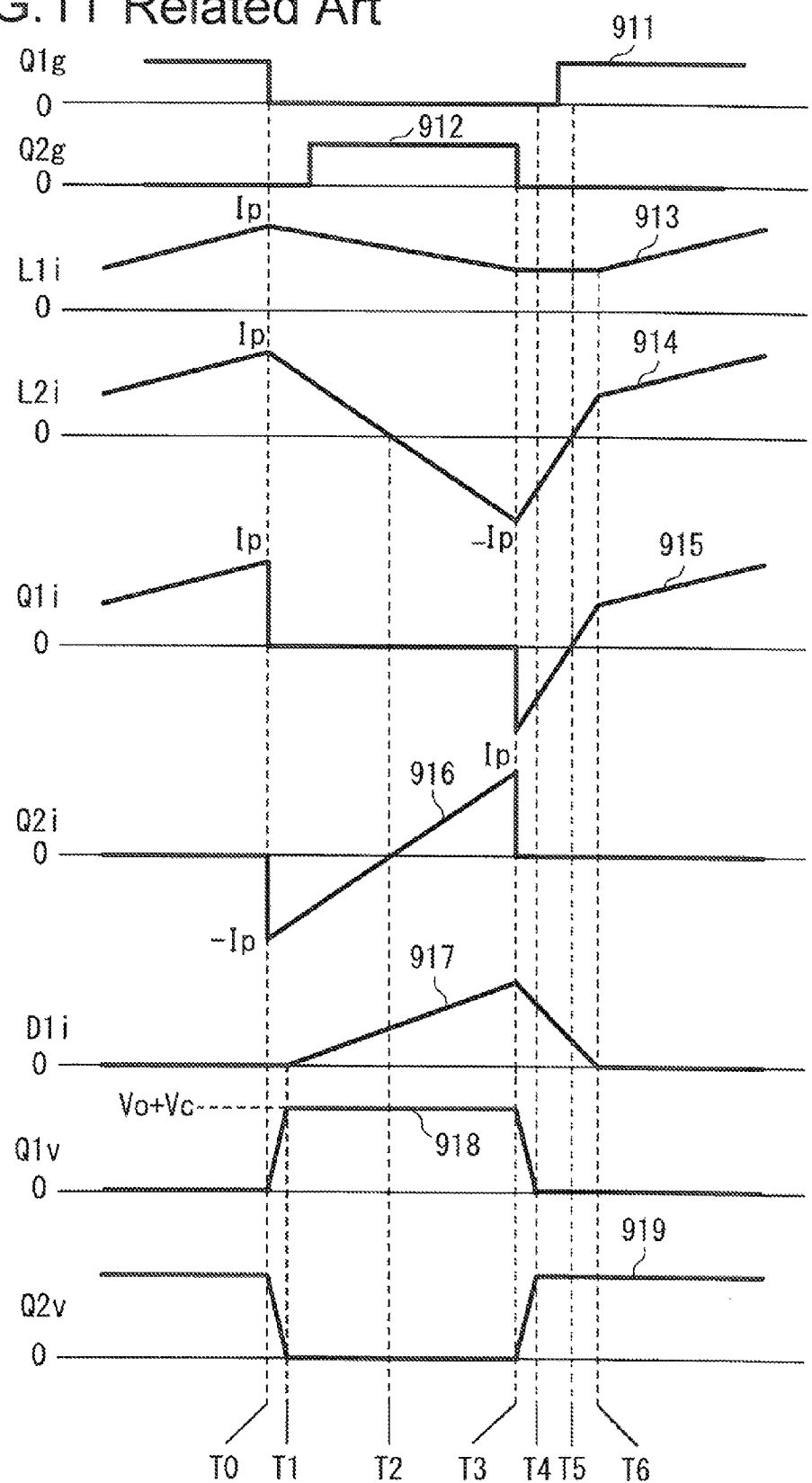
FIG. 11 An operation timing chart of the switching power supply circuit shown in FIG. 10.

When the input current of the voltage source 11 in FIG. 2 is assumed to be the charging current of the capacitor C1 in FIG. 10 (that is, the current in the direction facing C1 from Q2 in FIG. 10) and the output current of the voltage source 11 in FIG. 2 is assumed to be the discharge current of the capacitor C1 in FIG. 10 (that is, the current in the direction facing Q2 from C1 in FIG. 10), the condition of FIG. 3 (the condition of "the input current of the voltage source 11<the output current of the voltage source 11") corresponds to the condition of "the charging current of the capacitor C1<the discharge current of the capacitor C1" in the configuration of FIG. 10, and when such a condition appears in the circuit of FIG. 10, the voltage Vc of the capacitor C1 in FIG. 10 is lowered. Since in the circuit of FIG. 10, the voltage Vc of the capacitor C1 is assumed to be maintained at a constant value, when an inequality "the charging current of the capacitor C1<the discharge current of the capacitor C1" corresponding to "|Ip|<|Ith|" holds true, and thus the voltage Vc of the capacitor C1 is lowered, it is impossible to realize the zero voltage switching. By contrast, since in the circuit of FIG. 2, the voltage source 11 is provided, even when |Ip| is less than the predetermined value Ith necessary for the zero voltage switching, after the turning on of the switching element Q2, it is possible to reliably increase Q2$i$ (=−L2$i$) to Ith. In other words, in the circuit of FIG. 2, regardless of the value of |Ip|, it is possible to reliably realize the zero voltage switching.

Although the value of Ip is changed as the input voltage (Vin) or the output current of the switching power supply circuit is changed, the switching power supply circuit is configured according to the present embodiment, and thus it is possible to reliably realize the zero voltage switching of the switching elements Q1 and Q2 while coping with changes over a wide range in the input voltage and the output current.

Figure 4:
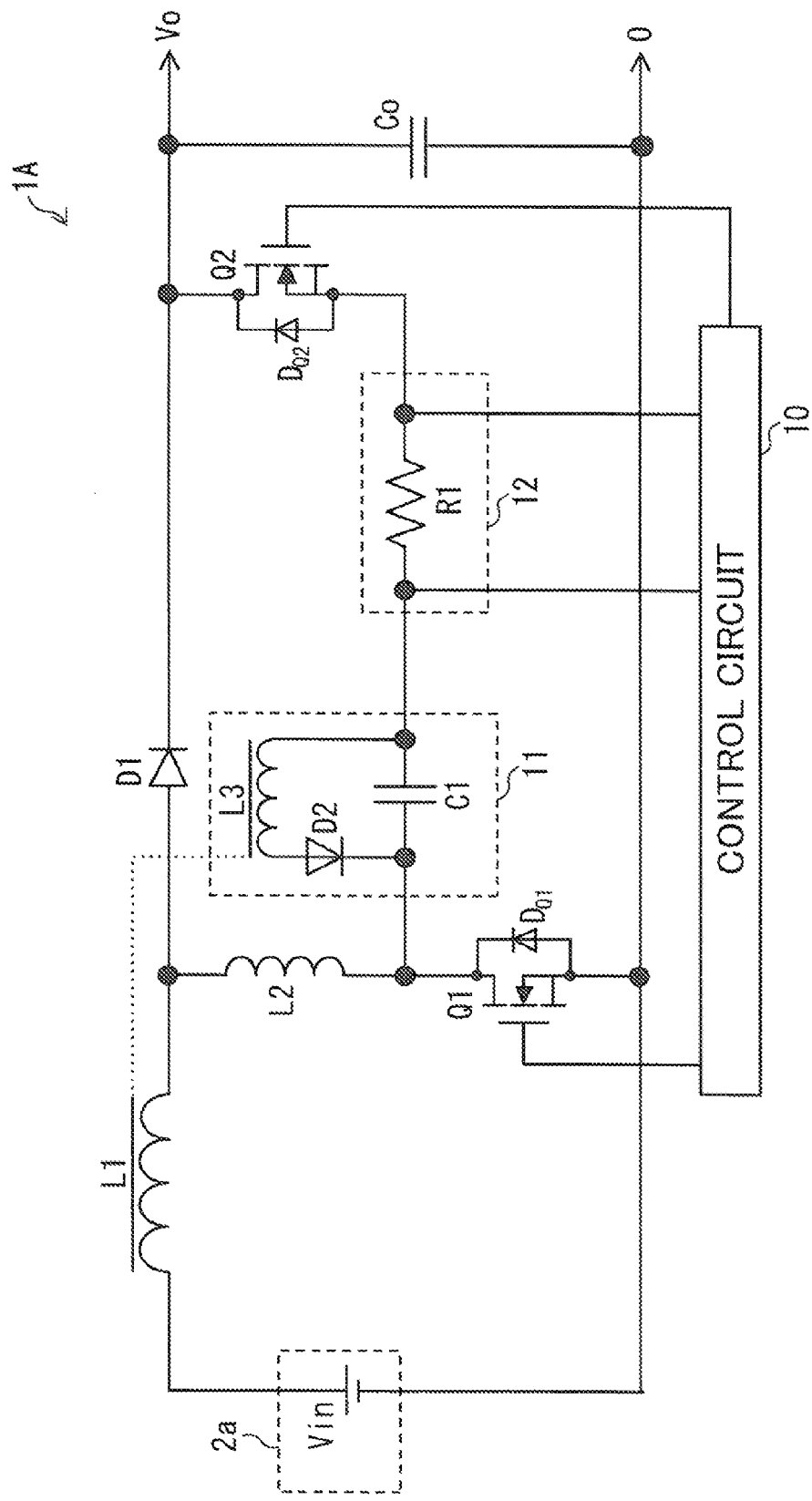
FIG. 4 A circuit diagram of the switching power supply circuit according to the first embodiment of the present invention.

FIG. 4 shows a circuit diagram of the power supply circuit 1A including a specific example of the circuit configuration of the voltage source 11 and the current detection portion 12. In the power supply circuit 1A of FIG. 4, the voltage source 11 is formed with an inductor L3 magnetically coupled with the inductor L1 and a rectifying and smoothing circuit connected in parallel to the inductor L3. The rectifying and smoothing circuit is formed with a diode D2 and the capacitor C1. In the power supply circuit 1A of FIG. 4, the current detection portion 12 is formed with a resistor R1. More specifically, in the power supply circuit 1A of FIG. 4, the source of the switching element Q2 is connected to one end of the resistor R1, and the other end of the resistor R1 is connected in common to the negative terminal of the capacitor C1 and one end of the inductor L3. The other end of the inductor L3 is connected to the anode of the diode D2, and the cathode of the diode D2 is connected to the positive terminal of the capacitor C1 and is also connected to the connection point between the inductor L2 and the drain of the switching element Q1.

In the power supply circuit 1A of FIG. 4, when the switching element Q1 is turned on and off, in the inductor L3, a voltage is induced that is the turn ratio (ratio of the number of turns of the coil of the inductor L3 to the number of turns of the coil of the inductor L1) times the voltage between both ends of the inductor L1 and that has the same polarity as that of the voltage between both ends of the inductor L1. The alternating-current voltage induced by the inductor L3 (third inductor), which can also be referred to as a second voltage source, is rectified with the diode D2 and is smoothed with the capacitor C1, with the result that the voltage between the positive terminal and the negative terminal of the capacitor C1 is maintained at a constant voltage (the direct-current voltage V11) (in other words, the constant voltage source 11 is realized). In this configuration, even when in realizing the zero voltage switching, the discharge current (the total amount of current Q2$i$ between the time t2 and the time t3 in FIG. 3) of the capacitor C1 is higher than the charging current (the total amount of current Q2$i$ between the time t0 and the time t2 in FIG. 3) of the capacitor C1, since the shortage of the charging current with respect to the discharge current is supplied by rectifying and smoothing the voltage induced by the inductor L3, the charging voltage of the capacitor C1 is maintained at the contact voltage (V11).

In the circuit configuration of FIG. 4, since the voltage source 11 is formed by utilization of the voltage induced by the inductor, it is possible to form the voltage source 11 with a small number of components. Although in the circuit of FIG. 4, the inductor L3 is magnetically coupled with the inductor L1, the present invention is not limited to this configuration, and the inductor L3 may be magnetically coupled with the inductor L2 or may be magnetically coupled with an inductor or a transformer of another converter (not shown) electrically connected to the power supply circuit 1A. In these configurations, the same effects can be obtained.

In the circuit of FIG. 4, the voltage between both ends of the resistor R1 is fed as a voltage signal corresponding to the value of the current Q2$i$ to the control circuit 10, and thus the detection of the current Q2$i$ is realized. The current detection portion 12 may be formed with an element (for example, a current transformer) other than the resistor R1. The current detection portion 12 may detect the current Q2$i$ by detecting the drain-source voltage Q2$v$ of the switching element Q2. In this case, preferably, the current detection portion 12 detects the voltage Q2$v$, and detects the value of the current Q2$i$ based on the detection voltage value and a known on-resistance value (that is, the resistance value between the drain and the source of the switching element Q2 when the switching element Q2 is on). Although the detection of the current Q2$i$ based on the voltage Q2$v$ cannot be utilized during the period in which the switching element Q2 is off, since the result of the detection of the current detection portion 12 is utilized in order to determine timing (t3) for the turning off of the switching element Q2, it is sufficient to find Q2$i$ during the period in which the switching element Q2 is on.

Second Embodiment

Figure 5:
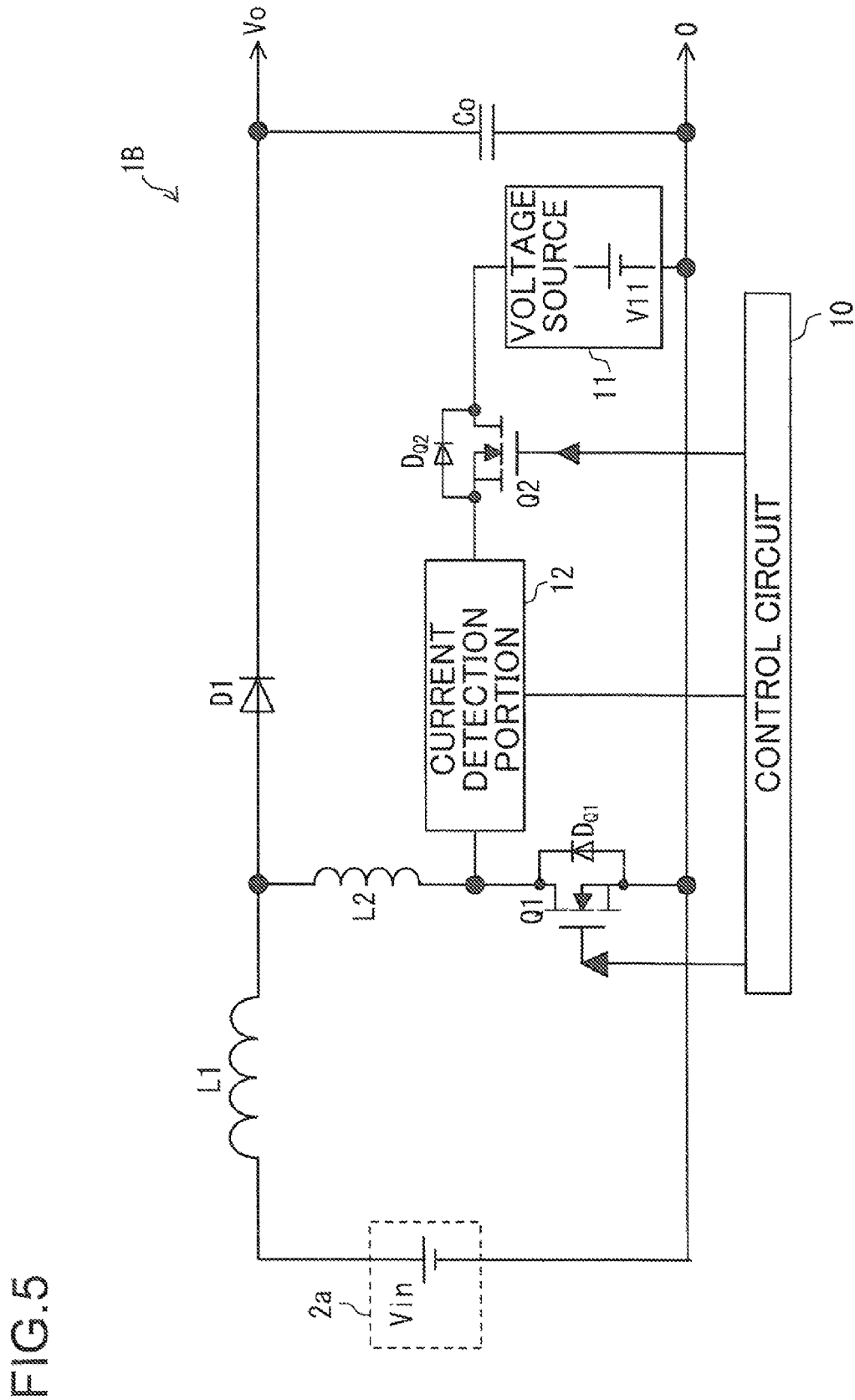
FIG. 5 A configuration diagram of a switching power supply circuit according to a second embodiment of the present invention.

The second embodiment of the present invention will be described. The second embodiment and the third to seventh embodiments, which will be described later are embodiments based on the first embodiment; with respect to an item that is not particularly described in the second to seventh embodiments, what is described in the first embodiment is applied to the second to seventh embodiments unless otherwise a contradiction arises. FIG. 5 is a configuration diagram of a switching power supply circuit 1B as the power supply circuit 1 according to the second embodiment. The power supply circuit 1B has the same constituent elements as those included in the power supply circuit 1A of the first embodiment, and the detailed configurations of the voltage source 11 and the current detection portion 12 in the power supply circuit 1B may be the same as those of the voltage source 11 and the current detection portion 12 described in the first embodiment.

The connection relationship between the power input portion 2$a$, the inductor L1, the inductor L2, the switching element Q1, the diode D1 and the capacitor Co is the same between the power supply circuits 1A and 1B. However, in the power supply circuit 1A of FIG. 2, the series circuit of the switching element Q2 and the voltage source 11 is connected between the connection point between the inductor L2 and the switching element Q1 and the power output portion (the positive terminal of the capacitor Co) whereas in the power supply circuit 1B of FIG. 5, the above-mentioned series circuit is connected between the connection point between the L2 and the switching element Q1 and the ground.

More specifically, in the power supply circuit 1B of FIG. 5, the negative terminal of the voltage source 11 is connected to the ground, the positive terminal of the voltage source 11 is connected to the drain of the switching element Q2 and the source of the switching element Q2 is connected through the current detection portion 12 to the connection point between the inductor L2 and the drain of the switching element Q1. In the power supply circuit 1B, the current detection portion 12 may also detect the current L2$i$ either instead of the current Q2$i$ or in addition to the current Q2$i$. In the power supply circuit 1B, with the same method as in the power supply circuit 1A, it is also possible to realize the zero voltage switching of the switching elements Q1 and Q2.

Third Embodiment

Figure 6:
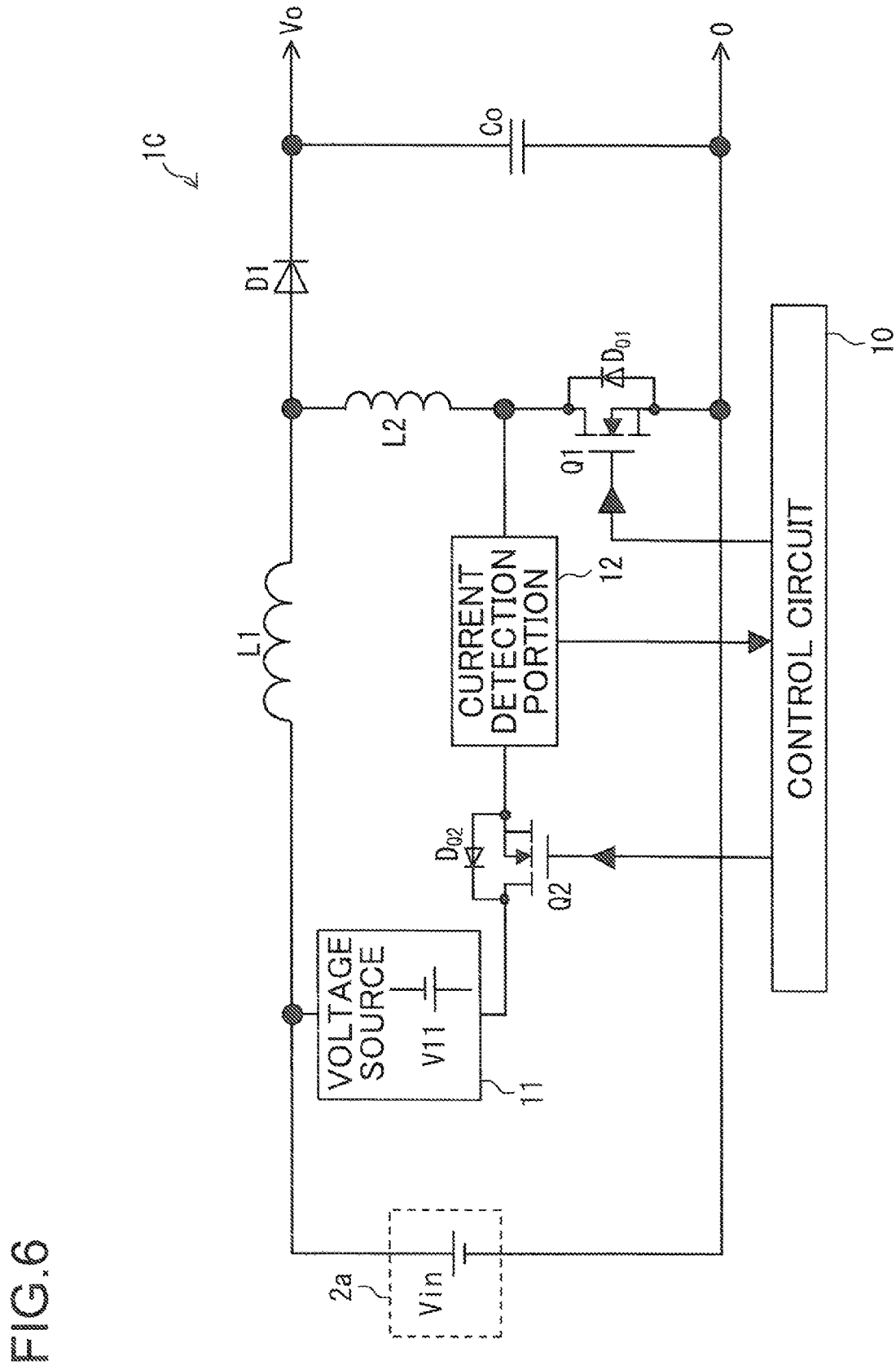
FIG. 6 A configuration diagram of a switching power supply circuit according to a third embodiment of the present invention.

The third embodiment of the present invention will be described. FIG. 6 is a configuration diagram of a switching power supply circuit 1C as the power supply circuit 1 according to the third embodiment. The power supply circuit 1C has the same constituent elements as those included in the power supply circuit 1A of the first embodiment, and the detailed configurations of the voltage source 11 and the current detection portion 12 in the power supply circuit 1C may be the same as those of the voltage source 11 and the current detection portion 12 described in the first embodiment.

The connection relationship between the power input portion 2$a$, the inductor L1, the inductor L2, the switching element Q1, the diode D1 and the capacitor Co is the same between the power supply circuits 1A and 1C. However, in the power supply circuit 1C of FIG. 2, the series circuit of the switching element Q2 and the voltage source 11 is connected between the connection point between the inductor L2 and the switching element Q1 and the power input portion 2$a$.

More specifically, in the power supply circuit 1C of FIG. 6, the negative terminal of the voltage source 11 is connected to the connection point between the positive terminal of the power input portion 2$a$ and the inductor L1, the positive terminal of the voltage source 11 is connected to the drain of the switching element Q2 and the source of the switching element Q2 is connected through the current detection portion 12 to the connection point between the inductor L2 and the drain of the switching element Q1. In the power supply circuit 1C, the current detection portion 12 may also detect the current L2$i$ either instead of the current Q2$i$ or in addition to the current Q2$i$. In the power supply circuit 1C, with the same method as in the power supply circuit 1A, it is also possible to realize the zero voltage switching of the switching elements Q1 and Q2.

Fourth Embodiment

Figure 7:
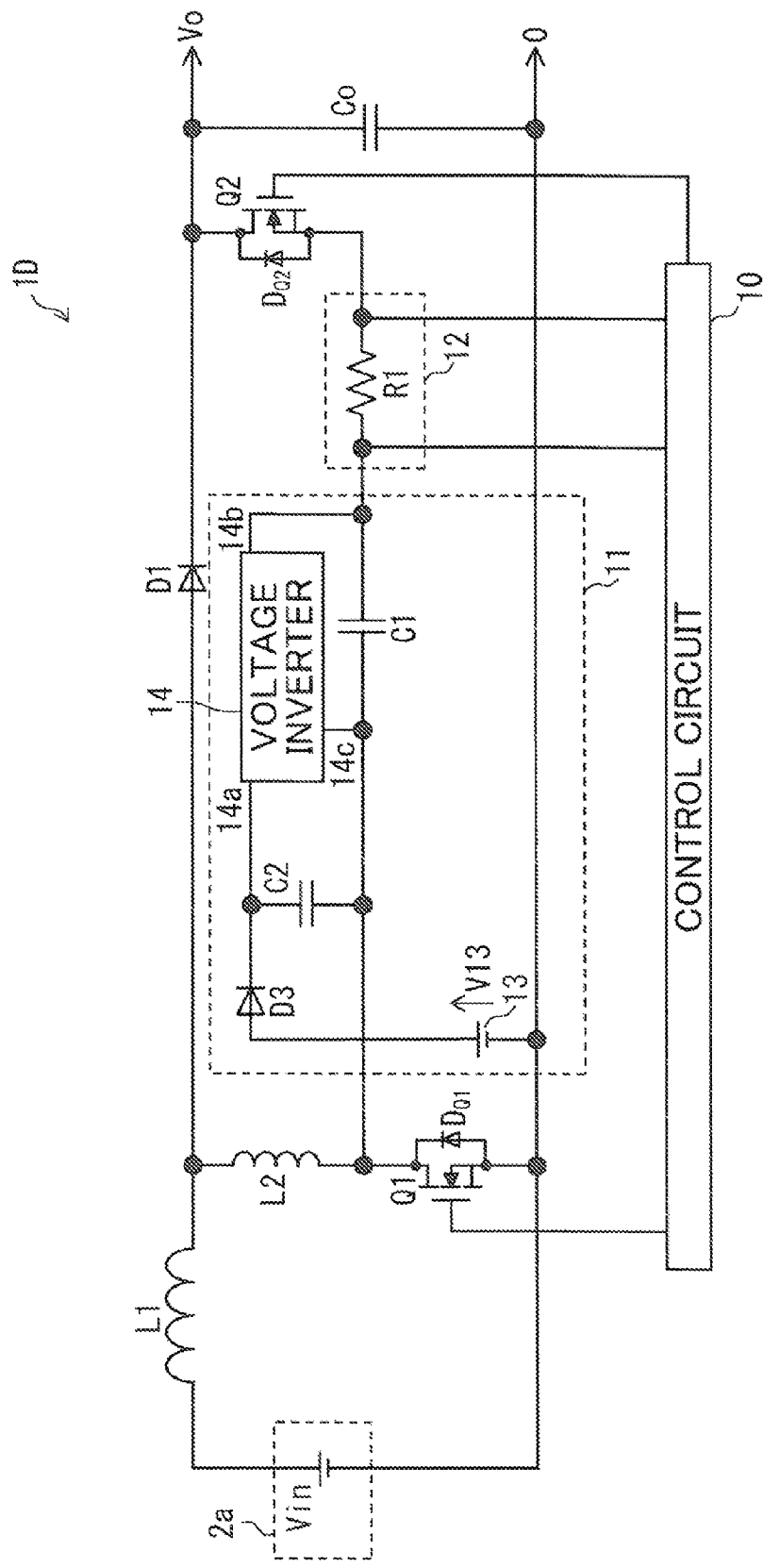
FIG. 7 A configuration diagram of a switching power supply circuit according to a fourth embodiment of the present invention.

The fourth embodiment of the present invention will be described. In the fourth embodiment, a variation of the specific configuration of the voltage source 11 will be described. FIG. 7 is a configuration diagram of a switching power supply circuit 1D as the power supply circuit 1 according to the fourth embodiment. The power supply circuit 1D has the same constituent elements as those included in the power supply circuit 1A of FIG. 2. However, the internal configuration of the voltage source 11 in the power supply circuit 1D is different from that shown in the first embodiment (see FIG. 4), and the voltage source 11 of the power supply circuit 1D is formed with a voltage source 13 that outputs a constant direct-current voltage V13, the capacitors C1 and C2, a diode D3 and a voltage inverter 14. The specific configuration of the current detection portion 12 may be the same as that in the first embodiment. In the power supply circuit 1D of FIG. 7, as an example, the current detection portion 12 is formed with the resistor R1 that is inserted between the voltage source 11 and the switching element Q2. Except that the detailed configuration of the voltage source 11 is different, the connection relationship between the power input portion 2a, the inductor L1, the inductor L2, the switching element Q1, the diode D1, the capacitor Co, the voltage source 11, the current detection portion 12 and the switching element Q2 is the same between the power supply circuits 1A and 1D.

The voltage inverter 14 includes a pair of input terminals and a pair of output terminals. In the example of FIG. 7, the input terminals of the voltage inverter 14 are formed with the terminals 14a and 14c, and the output terminals of the voltage inverter 14 are formed with the terminals 14b and 14c. The voltage inverter 14 converts, with reference to the potential of the terminal 14c, a positive input voltage applied between the terminals 14a and 14c into a negative output voltage, and outputs, with reference to the potential of the terminal 14c, this negative output voltage between the terminals 14b and 14c. The diode D3 and the capacitor C2 form a rectifying and smoothing circuit. As the voltage inverter 14, a device in which a switched capacitor method is adopted is generally known.

In the power supply circuit 1D, the negative terminal of the voltage source 13 is connected to the ground, the positive terminal of the voltage source 13 is connected to the anode of the diode D3, the cathode of the diode D3 is connected to the terminal 14a, the positive terminal and the negative terminal of the capacitor C1 are connected to the terminals 14c and 14b, respectively, the capacitor C2 is connected between the terminals 14a and 14c, the positive terminal of the capacitor C1 is connected to the connection point between the inductor L2 and the drain of the switching element Q1 and the negative terminal of the capacitor C1 is connected through the current detection portion 12 to the source of the switching element Q2.

When the switching element Q1 is turned on, a current flows through a path passing through the voltage source 13, the diode D3 and the capacitor C2, and the capacitor C2 is charged with the voltage V13. When the switching element Q1 is turned off, since the cathode potential of the diode D3 becomes higher than the anode potential of the diode D3, the diode D3 is turned off. A circuit involving such an operation is generally referred to as a bootstrap circuit. The voltage inverter 14 converts a voltage input to itself, that is, the charging voltage (=V13) of the capacitor C2, into a desired negative voltage, and maintains the charging voltage of the capacitor C1 at a constant voltage.

In the fourth embodiment, the same effects as in the first embodiment can also be obtained. The circuit configuration of the voltage source 11 shown in FIG. 7 may be applied to the voltage source 11 of the second or third embodiment described above or may be applied to the voltage source 11 of the fifth and sixth embodiments, which will be described later.

Fifth Embodiment

Figure 8:
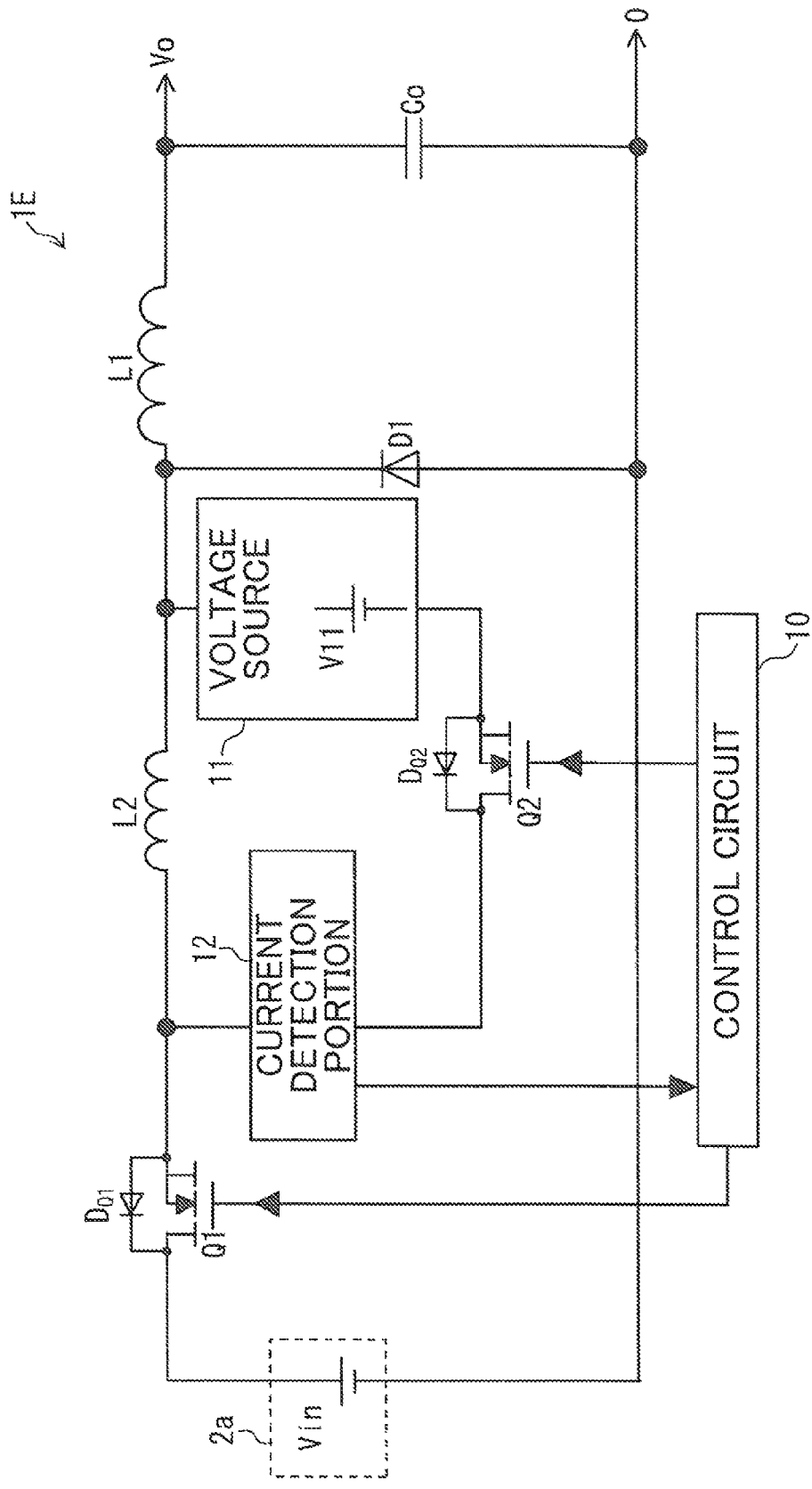
FIG. 8 A configuration diagram of a switching power supply circuit according to a fifth embodiment of the present invention.

The fifth embodiment of the present invention will be descried. Although in the first to fourth embodiments, the step-up converter method is adopted for the switching power supply circuit 1, a step-down converter method may be adopted for the power supply circuit 1. FIG. 8 is a configuration diagram of a switching power supply circuit 1E as the power supply circuit 1 according to the fifth embodiment. Since in the power supply circuit 1E, the step-down converter method is adopted, Vin>Vo. The power supply circuit 1E has the same constituent elements as those included in the power supply circuit 1A of the first embodiment, and the detailed configurations of the voltage source 11 and the current detection portion 12 in the power supply circuit 1E may be the same as those of the voltage source 11 and the current detection portion 12 described in the first or fourth embodiment. In the power supply circuit 1E, since the step-down converter method is adopted, the series circuit of the switching element Q2 and the voltage source 11 is connected between the connection point between the inductor L2 and the switching element Q1 and the terminal (the connection point between the diode D1, the inductor L1 and the inductor L2) of the diode D1.

A detailed component connection relationship in the power supply circuit 1E will be described below. The positive terminal of the power input portion 2a is connected to the drain of the switching element Q1, and the negative terminal of the power input portion 2a is connected to the ground. The source of the switching element Q1 is connected to one end of the inductor L2, and is also connected through the current detection portion 12 to the drain of the switching element Q2. The other end of the inductor L2 is connected in common to the positive terminal of the voltage source 11, the cathode of the diode D1 and one end of the inductor L1, and the other end of the inductor L1 is connected to the positive terminal of the capacitor Co. The negative terminal of the capacitor Co and the anode of the diode D1 are connected to the ground. The source of the switching element Q2 is connected to the negative terminal of the voltage source 11.

In the power supply circuit 1E, with the same method as in the power supply circuit 1A, it is also possible to realize the zero voltage switching of the switching elements Q1 and Q2, and thus the same effects as in the first embodiment can be obtained.

Sixth Embodiment

Figure 9:
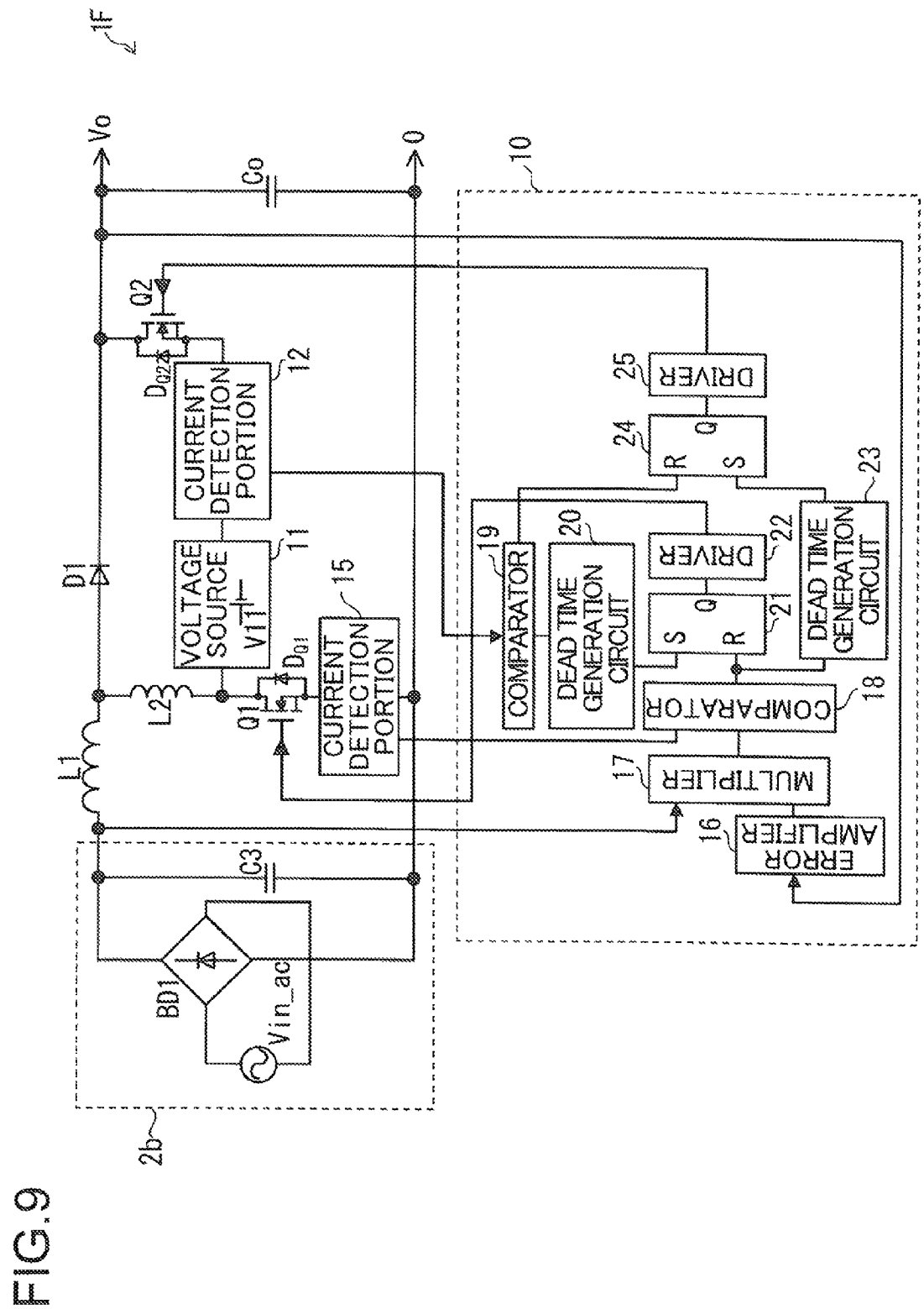
FIG. 9 A configuration diagram of a switching power supply circuit according to a sixth embodiment of the present invention.

The sixth embodiment of the present invention will be described. FIG. 9 is a configuration diagram of a switching power supply circuit 1F as the power supply circuit 1 according to the sixth embodiment. The power supply circuit 1F has the same constituent elements as those included in the power supply circuit 1A of the first embodiment, and further includes a current detection portion 15. The detailed configurations of the voltage source 11 and the current detection portion 12 in the power supply circuit 1F may be the same as those of the voltage source 11 and the current detection portion 12 described in the first or fourth embodiment.

The connection relationship between the inductor L1, the inductor L2, the switching element Q1, the diode D1, the capacitor Co, the switching element Q2, the current detection portion 12 and the voltage source 11 is the same between the power supply circuits 1A and 1F. The current detection portion 15 is a current sensor that detects the current Q1$i$ flowing between the drain and the source of the switching element Q1. However, the current detection portion 15 may be a current sensor that detects the current L1$i$ flowing through the inductor L1. The current detection portion 15 may also detect both the currents Q1$i$ and L1$i$. In the circuit example of FIG. 9, the current detection portion 15 is inserted between the source of the switching element Q1 and the ground. The configuration of the current detection portion 15 may be the same as that of the current detection portion 12 described above.

In the power supply circuit 1F, the power input portion 2 (see FIG. 1) is formed as a power input portion 2b. The power input portion 2b is formed with an alternating-current power supply (for example, a commercial alternating-current power supply) that outputs an alternating-current voltage Vin_ac, a diode bridge (rectifying circuit) BD1 that full-wave rectifies the alternating-current voltage Vin_ac and a capacitor C3 that stores the power of a pulsating voltage obtained by the full-wave rectification. The pulsating voltage obtained by the full-wave rectification of the diode bridge BD1 is applied to the capacitor C3, and is also input as the input voltage Vin to the power supply circuit 1F. The positive terminal of the capacitor C3 is connected through the inductor L1 to the connection point between the inductor L2 and the diode D1, and the negative terminal of the capacitor C3 is connected to the ground.

The control circuit 10 of the power supply circuit 1F includes individual portions referenced by symbols 16 to 25, and controls the turning on and off of the switching elements Q1 and Q2 based on the detection current information (that is, the detection value of the current Q2i or the current L2i) of the current detection portion 12, the detection current information (that is, the detection value of the current Q1i or the current L1i) of the current detection portion 15, the output voltage information and the input voltage information, and thereby realizes not only the zero voltage switching of the switching elements Q1 and Q2 but also the improvement of a power factor. In the power supply circuit 1F, a voltage detection portion (not shown) that detects the output voltage Vo and a voltage detection portion (not shown) that detects the input voltage Vin as the pulsating voltage applied to the capacitor C3 are provided. The output voltage information and the input voltage information are information indicating the detection value of the output voltage Vo and information indicating the detection value of the input voltage Vin, respectively.

An error amplifier 16 compares the output voltage Vo (or a voltage obtained by dividing the output voltage Vo) with a predetermined reference voltage, and outputs a voltage signal proportional to the difference thereof. A multiplier 17 multiples the output voltage signal of the error amplifier 16 by a voltage signal indicating the pulsating voltage, which is the input voltage information, and outputs the signal of the result of the multiplication (voltage signal in the shape of a full-wave rectified voltage waveform). A comparator 18 compares the output signal of the multiplier 17 with the output signal (that is, a voltage signal proportional to the current Q1i or L1i) of the current detection portion 15.

The comparator 18 outputs a high-level voltage signal in a first state where the output signal of the current detection portion 15 is higher than that of the multiplier 17, and outputs a low-level voltage signal in a second state where the output signal of the current detection portion 15 is lower than that of the multiplier 17. The output signal of the comparator 18 is input to the reset terminal of a flip-flop 21 that is formed as a RS type flip-flop. Hence, when the second state is switched to the first state, the high-level voltage signal from the comparator 18 is input to the reset terminal of the flip-flop 21, and consequently, the low-level voltage signal is supplied from the Q terminal of the flip-flop 21 through a driver 22 to the gate of the switching element Q1, and thus the switching element Q1 is turned off. This operation corresponds to the operation at the time t0 in FIG. 3, and this operation causes the peak value of a current flowing through the inductor L1 and the switching element Q1 to become a value that is proportional to the input voltage Vin (the pulsating voltage described above). For the alternating-current power supply, this is equivalent to the fact that the entire circuit including the power supply circuit 1F and a load connected to the power output portion of the power supply circuit 1F acts as a resistance load. In other words, the control circuit 10 can control and improve the power factor of the entire circuit for the alternating-current power supply (the alternating-current power caused by the alternating-current voltage Vin_ac) based on the input voltage information, the output voltage information and the detection current information of the current detection portion 15.

The high-level voltage signal from the comparator 18 is input through a dead time generation circuit 23 to the set terminal of a flip-flop 24 formed as a RS type flip-flop, and a signal from the Q terminal of the flip-flop 24 is supplied through a driver 25 to the gate of the switching element Q2. Hence, after a predetermined dead time has elapsed since the turning off of the switching element Q1, the turning on of the switching element Q2 is realized. This operation corresponds to the operation between the time t1 and the time t2 in FIG. 3.

On the other hand, the output voltage (that is, the voltage signal proportional to the current Q2i or L2i) of the current detection portion 12 is input to a comparator 19. The comparator 19 compares the output signal of the current detection portion 12 with a voltage signal corresponding to a predetermined current value (Ith), and outputs, when a current value indicated by the output signal of the current detection portion 12 is equal to or more than a predetermined current value, the high-level voltage signal to the reset terminal of the flip-flop 24. Consequently, the low-level voltage signal is output from the Q terminal of the flip-flop 24, and the low-level voltage signal is supplied through the driver 25 to the gate of the switching element Q2, and thus the turning off of the switching element Q2 is realized. This operation corresponds to the operation at the time 3 in FIG. 3.

The high-level voltage signal from the comparator 19 is input through a dead time generation circuit 20 to the set terminal of the flip-flop 21. Since the output signal from the Q terminal of the flip-flop 21 is supplied through the driver 22 to the gate of the switching element Q1, after a predetermined dead time has elapsed since the turning off of the switching element Q2, the turning on of the switching element Q1 is realized. This operation corresponds to the operation between the time t4 and the time t5 in FIG. 3.

As described above, in the power supply circuit 1F, it is possible to realize the effects described in the first embodiment and also realize the improvement of the power factor. In other words, even in the switching power supply circuit including the power factor improvement circuit, it is possible to reliably realize the zero voltage switching of the switching elements Q1 and Q2 while coping with changes over a wide range in the input voltage and the output current. Although in FIG. 9, the control circuit 10 of the sixth embodiment having the power factor improvement function is applied to the circuit configuration of the first embodiment, the sixth embodiment may be applied to any of the second to fifth embodiments (that is, the control circuit 10 of FIG. 9 may be used as the control circuit 10 of any of the power supply circuits 1B to 1E in the second to fifth embodiments).

Seventh Embodiment

The seventh embodiment of the present invention will be described. In the seventh embodiment, items in common to all the first to sixth embodiments or items related to part of the first to sixth embodiments will be descried. The switching power supply circuit 1 and the control circuit 10 described in the seventh embodiment respectively indicate any one of the switching power supply circuits 1A to 1F and the control circuit 10 of any one of the switching power supply circuits 1A to 1F.

In the switching power supply circuit 1, the switching element Q1 turns on and off the passage of the current supplied from the power input portion 2 (2a, 2b); the inductor L1 stores power input to itself through the switching element Q1 from the power input portion 2 (2a, 2b), and discharges the stored power to the power output portion 3; the diode D1 (rectifying diode) rectifies the current flowing to the power output portion 3; the capacitor Co (smoothing capacitor) smoothes the voltage (Vo) in the power output portion 3; the inductor L2 is inserted into the path of a current flowing from the power input portion 2 (2a, 2b) to the switching element Q1 and the inductor L1 during the period in which the switching element Q1 is on; and the control circuit 10 utilizes the series circuit of the switching element Q2 and the voltage source 11 and determines and controls timing for the turning on of the switching element Q1 and the turning on of and the turning off of the switching element Q2 such that both the voltage Q1v applied to both ends of the switching element Q1 when the switching element Q1 is turned on and the voltage Q2v applied to both ends of the switching element Q2 when the switching element Q2 is turned on are equal to or less than a predetermined value $V_{REF}$.

That the voltages Q1v and Q2v are equal to or less than the predetermined value $V_{REF}$ indicates that the absolute values of the voltages Q1v and Q2v are equal to or less than the predetermined value $V_{REF}$, and $V_{REF} \geq 0$. If the voltages Q1v and Q2v when the parasitic diodes $D_{Q1}$ and $D_{Q2}$ are conductive are assumed to be zero, the predetermined value $V_{REF}$ may be zero. The turning on of the switching element Q1 when the parasitic diode $D_{Q1}$ is conductive belongs to the fact that the voltage Q1v when the switching element Q1 is turned on is equal to or less than the predetermined value $V_{REF}$; the turning on of the switching element Q2 when the parasitic diode $D_{Q2}$ is conductive belongs to the fact that the voltage Q2v when the switching element Q2 is turned on is equal to or less than the predetermined value $V_{REF}$.

Although the control circuit 10 can determine and control timing for the turning off of the switching element Q2 according to the current Q2i or L2i, the control circuit 10 may determine and control timing for the turning off of the switching element Q2 according to both the currents Q2i and L2i. Even in the case where both of them are referenced, as shown in FIG. 3, in the end, the control circuit 10 turns off the switching element Q2 when the current Q2i is increased to reach the threshold value Ith or when the current L2i is decreased to reach the threshold value (−Ith).

In order to realize the zero voltage switching, the control circuit 10 turns on the switching element Q2 at the time when a predetermined time has elapsed since the time (t0) when the switching element Q1 was turned off. Preferably, the length of the predetermined time is previously set according to the circuit characteristic of the power supply circuit 1 such that the parasitic diode $D_{Q2}$ is conductive at the timing at which the switching element Q2 is turned on. Thereafter, when the current Q2i or L2i reaches the predetermined threshold value (Ith or −Ith), the control circuit 10 turns off the switching element Q2, and turns on the switching element Q1 at the time when a predetermined time has elapsed since the time (t3) when the switching element Q2 was turned off. Preferably, the length of the predetermined time is previously set according to the circuit characteristic of the power supply circuit 1 such that the parasitic diode $D_{Q1}$ is conductive at the timing at which the switching element Q1 is turned on. Then, the control circuit 10 determines timing for the turning off of the switching element Q1 again based on the output voltage information (the detection value of the output voltage Vo). Hence, based on the output voltage information, the control circuit 10 controls a frequency of repeatedly turning on and off of the switching element Q1 (that is, the switching frequency of the switching element Q1) and a duty ratio.

<<Variations and the Like>>

In the embodiments of the present invention, various modifications are possible as necessary in the scope of the technical idea indicated by the scope of claims. The embodiments described above are simply examples of the embodiment according to the present invention; the present invention and the significance of the terms of configuration requirements are not limited by what have been described in the above embodiments. Specific values indicated in the above description are simply illustrative; it is needless to say that they can be changed to various values. As explanatory notes applicable to the above embodiments, explanatory notes 1 and 2 will be described below. The details of the explanatory notes can be arbitrarily combined unless otherwise a contradiction arises.

[Explanatory Note 1]

Although in the circuit example described above, the switching elements Q1 and Q2 are formed as N-channel type MOSFETs, in the switching power supply circuit 1 (1A to 1F), the switching elements Q1 and Q2 may be formed as P-channel type MOSFETs or may be formed with a semiconductor switching element (such as a junction type field-effect transistor or a bipolar transistor) that is not classified into a MOSFET.

[Explanatory Note 2]

In this case, if the diodes $D_{Q1}$ and $D_{Q2}$ are not formed incidentally as parasitic diodes by the formation of the switching elements Q1 and Q2, the diodes $D_{Q1}$ and $D_{Q2}$ are preferably provided as separate components in the switching power supply circuit 1 (1A to 1F). Even if parasitic diodes are formed incidentally by the formation of the switching elements Q1 and Q2, the diodes $D_{Q1}$ and $D_{Q2}$ may be provided as separate components in the switching power supply circuit 1 (1A to 1F).

LIST OF REFERENCE SYMBOLS 1, 1A to 1F switching power supply circuit
2, 2a, 2b power input portion
3 power output portion
10 control circuit
11 voltage source
12, 15 current detection portion
Q1, Q2 switching element
L1, L2 inductor

The invention claimed is:

1. A switching power supply circuit that includes: a first switching element which turns on and off passage of a current supplied from a power input portion; a first inductor which stores a power input through the first switching element and which discharges the power to a power output portion; a rectifying diode which rectifies a current toward the power output portion; and a smoothing capacitor which smoothes a voltage in the power output portion, the switching power supply circuit comprising:
- a second inductor that is inserted into a path of a current which flows from the power input portion to the first switching element and the first inductor during a period in which the first switching element is on;
- a series circuit that is formed by connecting a second switching element and a voltage source in series;
- a current detection portion that detects a current flowing through the second switching element or a current flowing through the second inductor; and
- a control circuit that controls turning on of the first switching element and turning on of and turning off of the second switching element such that a voltage applied to both ends of the first switching element when the first switching element is turned on and a voltage applied to both ends of the second switching element when the second switching element is turned on are equal to or less than a predetermined value, wherein the series circuit
- is connected between a connection point between the second inductor and the first switching element and the power output portion,
- is connected between the connection point and a reference potential point having a negative terminal potential of the power input portion,
- is connected between the connection point and the power input portion or
- is connected between the connection point and a terminal of the rectifying diode, and the control circuit turns on the second switching element after a predetermined time has elapsed since turning off of the first switching element, thereafter turns off the second switching element at timing at which a detection current value of the current detection portion reaches a predetermined threshold value and turns on the first switching element after a predetermined time has elapsed since the timing.

2. The switching power supply circuit according to claim 1,
wherein the control circuit turns on the first switching element after turning off of the first switching element, and thereafter determines timing at which the first switching element is turned on again according to a voltage of the power output portion.

3. The switching power supply circuit according to claim 1,
wherein the power input portion is formed with an alternating-current power supply, a rectifying circuit that rectifies an alternating-current power from the alternating-current power supply and a capacitor that stores a power of a pulsating voltage obtained by the rectification, and inputs the pulsating voltage to the switching power supply circuit, and
a control portion including the control circuit controls a power factor of a circuit including the switching power supply circuit for the alternating-current power supply based on the pulsating voltage, a voltage of the power output portion and a current flowing through the first switching element or the first inductor.

4. The switching power supply circuit according to claim 1,
wherein the voltage source outputs a direct-current voltage obtained by rectifying and smoothing an alternating-current voltage from a second voltage source.

5. The switching power supply circuit according to claim 4,
wherein the second voltage source is formed with a third inductor, and the alternating-current voltage is formed by a voltage induced by the third inductor.

6. The switching power supply circuit according to claim 5,
wherein the third inductor is magnetically coupled with the first inductor.

* * * * *